United States Patent
Kurakane et al.

(10) Patent No.: US 11,846,650 B2
(45) Date of Patent: Dec. 19, 2023

(54) ACCELERATION DETECTION DEVICE, WORK MACHINE, AND ACCELERATION DETECTION METHOD

(71) Applicant: KOMATSU Ltd., Tokyo (JP)

(72) Inventors: Toru Kurakane, Tokyo (JP); Ken Tagami, Tokyo (JP); Junghwa Park, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/639,695

(22) PCT Filed: Oct. 12, 2020

(86) PCT No.: PCT/JP2020/038465
§ 371 (c)(1),
(2) Date: Mar. 2, 2022

(87) PCT Pub. No.: WO2021/075400
PCT Pub. Date: Apr. 22, 2021

(65) Prior Publication Data
US 2022/0291253 A1    Sep. 15, 2022

(30) Foreign Application Priority Data

Oct. 18, 2019   (JP) ................................ 2019-191351

(51) Int. Cl.
G01P 21/00   (2006.01)
G01P 15/08   (2006.01)
G01P 15/18   (2013.01)

(52) U.S. Cl.
CPC .............. *G01P 21/00* (2013.01); *G01P 15/08* (2013.01); *G01P 15/18* (2013.01)

(58) Field of Classification Search
CPC ........... G01P 21/00; G01P 15/08; G01P 15/18
See application file for complete search history.

(56) References Cited

U.S. PATENT DOCUMENTS

| | | | |
|---|---|---|---|
| 5,493,248 A * | 2/1996 | Dunn ..................... | G01D 3/028 327/512 |
| 7,653,507 B2 * | 1/2010 | Yamada .................. | G01P 21/00 702/141 |
| 8,762,091 B1 | 6/2014 | Foxlin et al. | |
| 2006/0244576 A1* | 11/2006 | Sugie .................. | B60R 25/1004 340/429 |
| 2008/0140291 A1* | 6/2008 | Kobayashi .......... | B60W 40/107 701/70 |

(Continued)

FOREIGN PATENT DOCUMENTS

JP   A-02-019771   1/1990
JP   A-08-297033   11/1996

(Continued)

*Primary Examiner* — Helen C Kwok
(74) *Attorney, Agent, or Firm* — Fish & Richardson P.C.

(57) ABSTRACT

An acceleration detection device includes a first acceleration acquisition unit configured to acquire a first acceleration from a mechanical acceleration sensor a second acceleration acquisition unit configured to acquire a second acceleration from a non-mechanical acceleration sensor and a correction value calculation unit configured to calculate a correction value for correcting the first acceleration using the second acceleration.

13 Claims, 3 Drawing Sheets

(56) References Cited

U.S. PATENT DOCUMENTS

| | | | |
|---|---|---|---|
| 2008/0140292 A1* | 6/2008 | Suzuki | G01P 21/00 |
| | | | 701/70 |
| 2012/0081281 A1* | 4/2012 | Morichika | G01C 21/367 |
| | | | 345/156 |
| 2015/0088455 A1 | 3/2015 | Yamashita | |
| 2016/0244949 A1 | 8/2016 | Kanemitsu | |
| 2017/0297477 A1* | 10/2017 | Kasaba | B60Q 1/08 |
| 2019/0265270 A1* | 8/2019 | Yamashita | G06F 3/01 |

FOREIGN PATENT DOCUMENTS

| | | |
|---|---|---|
| JP | A-2017-067500 | 4/2017 |
| WO | WO 2014/020647 | 2/2014 |
| WO | WO 2015/177843 | 11/2015 |

* cited by examiner

ACCELERATION DETECTION DEVICE, WORK MACHINE, AND ACCELERATION DETECTION METHOD

CROSS-REFERENCE TO RELATED APPLICATIONS

This application is a National Stage application under 35 U.S.C. § 371 of International Application No. PCT/JP2020/038465, filed on Oct. 12, 2020, which claims priority to Japanese Patent Application No. 2019-191351, filed on Oct. 18, 2019. The contents of the prior applications are incorporated herein in their entirety.

TECHNICAL FIELD

The present disclosure relates to an acceleration detection device, a work machine, and an acceleration detection method.

Priority is claimed on Japanese Patent Application No. 2019-191351, filed Oct. 18, 2019, the content of which is incorporated herein by reference.

BACKGROUND

For example, as shown in Patent Document 1, some work machines such as hydraulic excavators and bulldozers are equipped with an inertial measurement unit (IMU) so that a posture angle such as a roll angle and a pitch angle can be obtained as information related to an inclination of the work machine using the IMU. In addition, the IMU is a measurement device including a three-axis gyroscope sensor and a three-axis acceleration sensor.

RELATED ART

Patent Document

Patent Document 1: WO2015/177843

SUMMARY OF THE INVENTION

Problems to be Solved by the Invention

As the acceleration sensor included in the IMU, for example, an acceleration sensor of a capacitance detection type, which is a mechanical sensor, is used. The acceleration sensor of the capacitance detection type includes a fixed electrode and a movable electrode, and detects acceleration based on a change in capacitance between the fixed electrode and the movable electrode according to the acceleration. In the acceleration sensor having such a mechanically movable portion, performance varies when an environmental impact such as temperature, vibration, or an impact is applied. For this reason, depending on the use environment, the performance of the acceleration sensor may change from that at the time of factory shipment in which calibration is performed.

The present disclosure has been made in view of the above-described circumstances, and an object of the present invention is to provide an acceleration detection device, a work machine, and an acceleration detection method capable of reducing a change in performance.

Means for Solving the Problem

In order to solve the above-described problem, an aspect of the present disclosure provides an acceleration detection device including: a first acceleration acquisition unit configured to acquire a first acceleration from a mechanical acceleration sensor; a second acceleration acquisition unit configured to acquire a second acceleration from a non-mechanical acceleration sensor; and a correction value calculation unit configured to calculate a correction value for correcting the first acceleration using the second acceleration.

Effects of the Invention

According to each aspect of the present disclosure, it is possible to reduce a change in performance of the mechanical acceleration sensor in acceleration detection.

DETAILED DESCRIPTION OF THE INVENTION

Hereinafter, embodiments of the present disclosure will be described with reference to the drawings. In the drawings, the same or corresponding components are denoted by the same reference numerals, and description thereof will be appropriately omitted.

Figure 1:
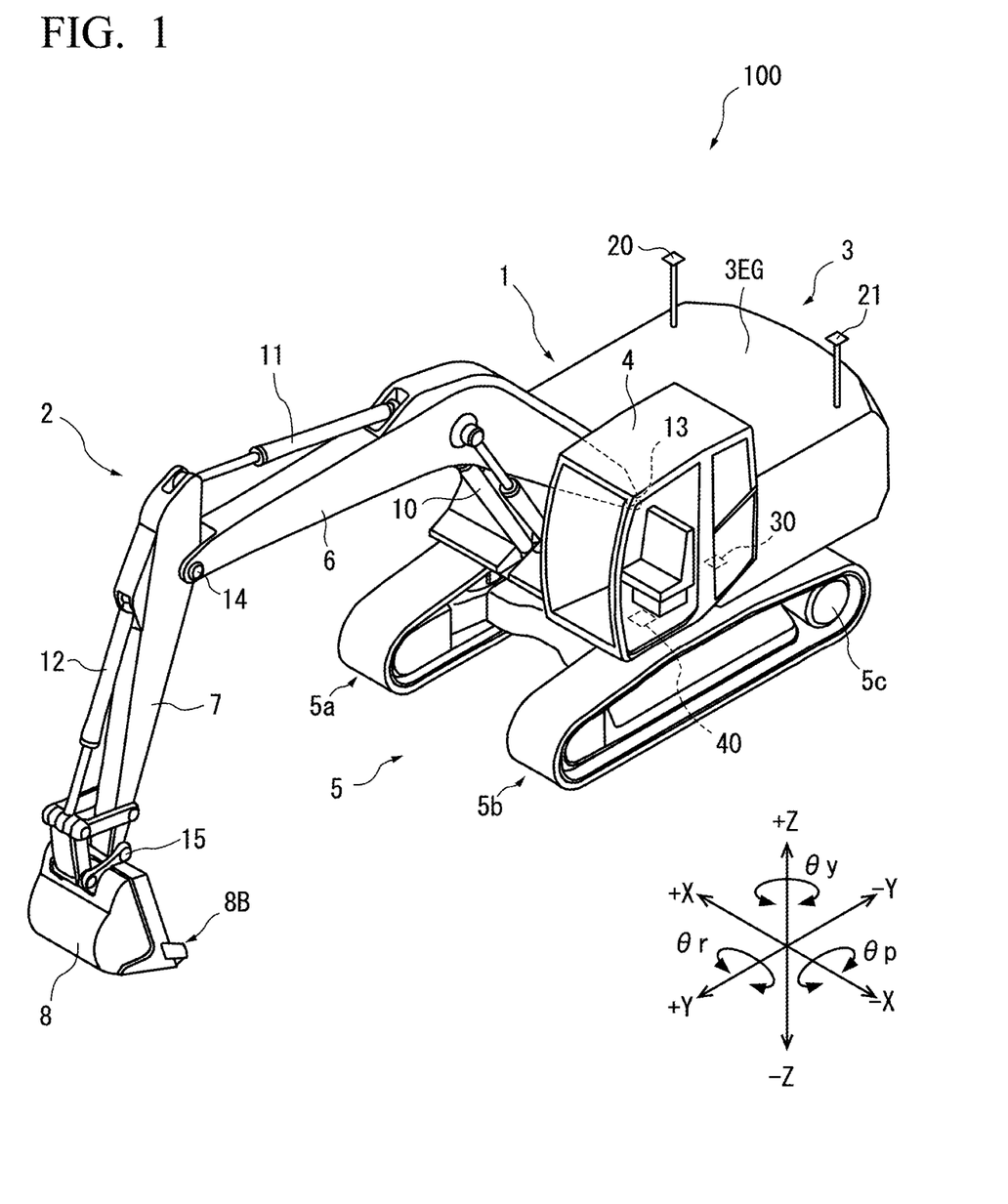
FIG. 1 is a perspective view of a work machine according to an embodiment of the present disclosure.
Figure 2:
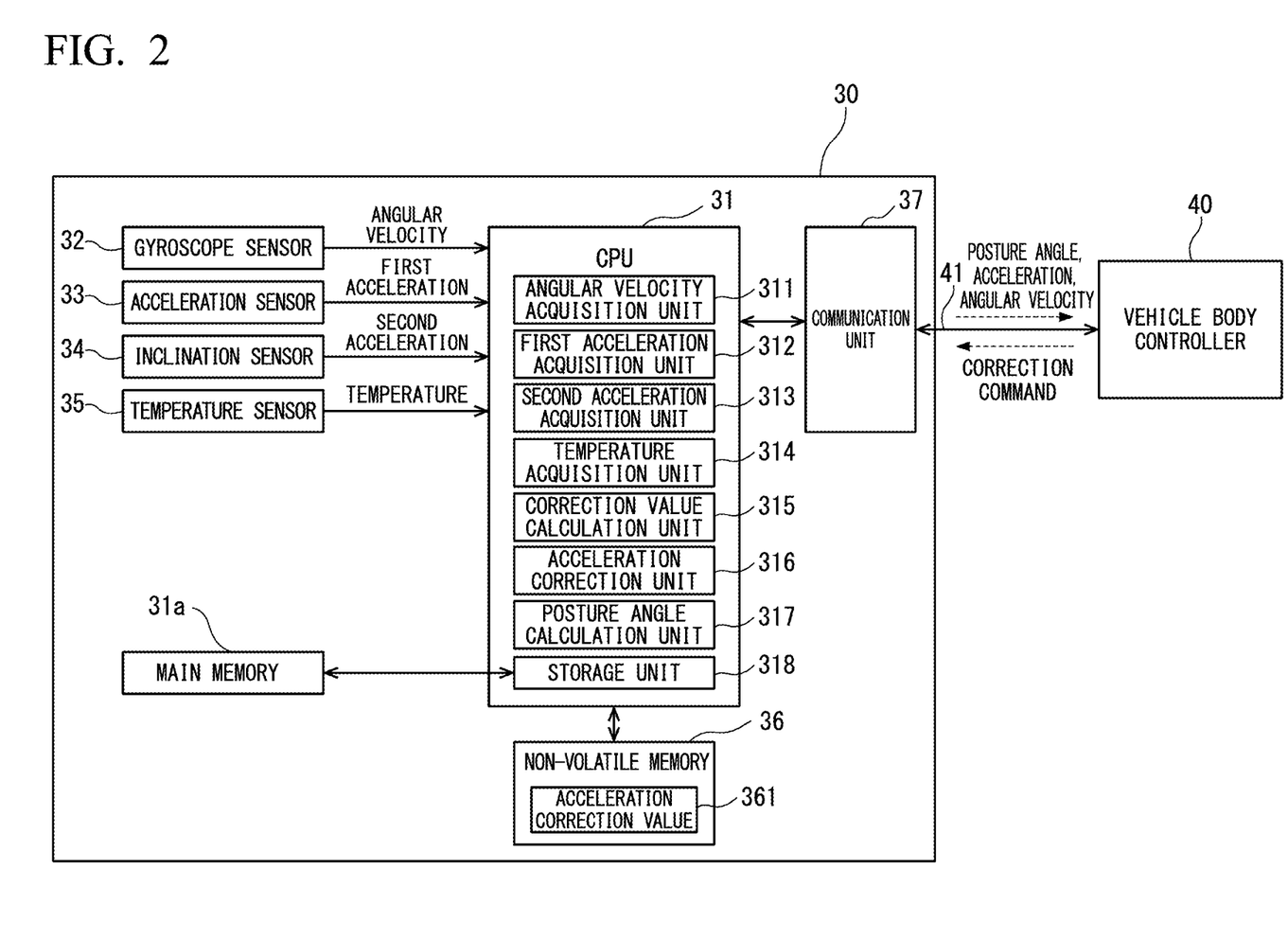
FIG. 2 is a block diagram showing a configuration example of an IMU 30 shown in FIG. 1.

FIG. 1 is a perspective view of a work machine according to an embodiment of the present disclosure. FIG. 2 is a block diagram illustrating a configuration example of an inertial measurement unit (IMU) 30 illustrated in FIG. 1. The hydraulic excavator 100 as a work machine includes a vehicle main body 1 and work equipment 2. The vehicle main body 1 includes an upper swing body 3 as a swing body and a travel device 5 as a travel body. An engine room 3EG is disposed on a rear end side of the upper swing body 3.

In the present embodiment, the hydraulic excavator 100 includes, in an engine room 3EG, an internal combustion engine such as a diesel engine as a power-generating device, a hydraulic pump that converts power generated by the power-generating device into pressure of a hydraulic fluid (hereinafter referred to as hydraulic pressure as appropriate), and the like. However, the power-generating device is not limited to the internal combustion engine. The power-generating device of the hydraulic excavator 100 may be, for example, a so-called hybrid-type device in which an internal combustion engine, a generator motor, and a power storage device are combined.

The upper swing body 3 has a cab 4. The cab 4 is installed on a front end side of the upper swing body 3. That is, the cab 4 is provided on a side opposite to that on which the engine room 3EG is disposed. In the cab 4, a display device, an operation device, and the like (not shown) are disposed. In a lower portion of the cab 4, an IMU 30 and a vehicle body controller 40 are provided. The vehicle body controller 40 controls, for example, a sensor such as the IMU 30, and controls the power-generating device, a hydraulic pressure control valve described later, and the like in accordance with an operation on an operation device by an operator.

The travel device 5 has crawler tracks 5*a* and 5*b*. In the travel device 5, one or both of hydraulic motors 5*c* provided on the left and right sides are driven to rotate the crawler tracks 5a and 5b, thereby causing the hydraulic excavator 100 to travel forward or rearward or to turn. The work equipment 2 is attached to a lateral side of the cab 4 of the upper swing body 3.

In addition, the hydraulic excavator 100 may include tires instead of the crawler tracks 5a and 5b, and may include a travel device to allow the hydraulic excavator to travel by transmitting a driving force from an engine or the like housed in the engine room 3EG to the tires via a transmission. As the hydraulic excavator 100 in such a form, for example, there is a wheel type hydraulic excavator. Further, the hydraulic excavator 100 may be, for example, a backhoe loader having a configuration in which work equipment is attached to a vehicle main body and a travel device having tires constituting part of the vehicle main body is provided.

In addition, in the upper swing body 3, a side on which the work equipment 2 and the cab 4 are disposed is a front side, and a side on which the engine room 3EG is disposed is a rear side. A left side when facing the front is a left side of the upper swing body 3, and a right side when facing the front is a right side of the upper swing body 3. In the hydraulic excavator 100 or the vehicle main body 1, the travel device 5 side is a lower side with respect to the upper swing body 3, and the upper swing body 3 side is an upper side with respect to the travel device 5. In a case where the hydraulic excavator 100 is installed on a horizontal surface, a lower side is a vertical direction, that is, an action direction side of gravity, and the upper side is a side opposite to the vertical direction.

The work equipment 2 includes a boom 6, an arm 7, a bucket 8, a boom cylinder 10, an arm cylinder 11, and a bucket cylinder 12. A base end portion of the boom 6 is swingably attached to a front portion of the upper swing body 3 via a boom pin 13. A base end portion of the arm 7 is swingably attached to a tip end portion of the boom 6 via an arm pin 14. A bucket 8 is attached to a tip end portion of the arm 7 via a bucket pin 15. The bucket 8 swings about the bucket pin 15. A plurality of blades 8B are attached to the bucket 8 on the opposite side of the bucket pin 15.

The bucket 8 may not have the plurality of blades 8B. That is, for example, the bucket may have a blade edge formed of a steel plate in a straight shape. In addition, for example, the work equipment 2 may include a tilt bucket having a single blade. The tilt bucket is a bucket that includes a bucket tilt cylinder, is capable of forming and leveling a slope and flat ground into any shape even when the hydraulic excavator is on sloped ground by tilting the bucket to the left and right, and is also capable of performing rolling compaction work using a bottom plate. In addition, the work equipment 2 may include a slope bucket, a rock-drilling attachment including a rock-drilling tip, or the like instead of the bucket 8.

The boom cylinder 10, the arm cylinder 11, and the bucket cylinder 12 shown in FIG. 1 are hydraulic cylinders driven by hydraulic pressure. The boom cylinder 10 drives the boom 6 to move it up and down. The arm cylinder 11 drives the arm 7 to rotate around the arm pin 14. The bucket cylinder 12 drives the bucket 8 to rotate around the bucket pin 15.

A hydraulic control valve (not shown) is provided between hydraulic cylinders such as the boom cylinder 10, the arm cylinder 11, and the bucket cylinder 12 and a hydraulic pump housed in the engine room 3EG. The hydraulic control valve includes a traveling-use control valve for driving the hydraulic motor 5c, and a work equipment-use control valve for controlling a swing motor that swings the boom cylinder 10, the arm cylinder 11, the bucket cylinder 12, and the upper swing body 3. The vehicle body controller 40 controls these hydraulic control valves to control the flow rate of the hydraulic oil supplied to the boom cylinder 10, the arm cylinder 11, the bucket cylinder 12, the swing motor, or the hydraulic motor 5c. As a result, operations of the boom cylinder 10, the arm cylinder 11, the bucket cylinder 12, and the like are controlled.

Antennas 20 and 21 are attached to an upper portion of the upper swing body 3. The antennas 20 and 21 are used to detect a current position of the hydraulic excavator 100. The antennas 20 and 21 are electrically connected to a position detection device (not shown) for detecting the current position of the hydraulic excavator 100. The position detection device detects the current position of the hydraulic excavator 100 by using RTK-GNSS (Real Time Kinematic-Global Navigation Satellite Systems, GNSS refers to a global navigation satellite system), and outputs the detected position information to the vehicle body controller 40. Signals corresponding to the GNSS radio waves received by the antennas 20 and 21 are input to the position detection device. The position detection device detects the installation positions of the antennas 20 and 21. As shown in FIG. 1, the antennas 20 and 21 are preferably installed on an upper portion of the upper swing body 3 at both end positions spaced apart from each other in the left-right direction of the hydraulic excavator 100.

As shown in FIG. 2, the IMU 30 and the vehicle body controller 40 are connected to each other via an in-vehicle signal line 41 and transmit and receive predetermined control signals to and from each other. The vehicle body controller 40 is connected, via the in-vehicle signal line 41, or the like, to a display device, an operation device, and the like, which are not shown, installed in the cab 4 and is connected to various sensors (not shown) such as sensors for detecting strokes of the boom cylinder 10, the arm cylinder 11, and the bucket cylinder 12 shown in FIG. 1, sensors for detecting angles of the boom 6 and the arm 7, and sensors for detecting a swing angle of the upper swing body 3. As a sensor for detecting the strokes of the boom cylinder 10, the arm cylinder 11, and the bucket cylinder 12, a proximity sensor, a rotary encoder, or the like, that detects the amount of expansion and contraction of each hydraulic cylinder can be used. In addition, encoders (not shown) may be provided at the base end portion of the boom 6 and the base end portion of the arm 7 so that the encoders can reset detection values of the proximity sensors or rotary encoders that detect the amount of expansion and contraction of each hydraulic cylinder.

The IMU 30 detects angular velocity and acceleration of the hydraulic excavator 100. As the hydraulic excavator 100 operates, various accelerations such as acceleration generated during traveling and angular velocity and acceleration of gravity generated during swinging occur, but the IMU 30 detects accelerations including at least the acceleration of gravity and detects the accelerations without distinguishing the types thereof. In order to detect the accelerations with higher accuracy, the IMU 30 is preferably provided on the swing center axis of the upper swing body 3 of the hydraulic excavator 100, for example; however, as described above, the IMU 30 may be installed in the lower portion of the cab 4.

In a coordinate system (X, Y, Z) shown in FIG. 1, the IMU 30 detects accelerations in an X-axis direction, a Y-axis direction, and a Z-axis direction and angular velocities around an X-axis, a Y-axis, and a Z-axis. In an example shown in FIG. 1, the Y-axis is an axis parallel to front-rear directions of the hydraulic excavator 100, the X-axis is an axis parallel to a width direction of the hydraulic excavator 100, and the Z-axis is an axis orthogonal to both the X-axis and the Y-axis. The coordinate system (X, Y, Z) may be, for example, a vehicle body coordinate system.

Further, the IMU 30 calculates a posture angle of the hydraulic excavator 100 based on the detected angular velocities and accelerations, and outputs the posture angle to the vehicle body controller 40. An inclination of the hydraulic excavator 100 can be represented by a pitch angle, a roll angle, and a yaw angle. The pitch angle is an angle (θp) when the hydraulic excavator 100 is inclined about the X-axis, the roll angle is an angle (θr) when the hydraulic excavator 100 is inclined about the Y-axis, and the yaw angle is an angle (θy) when the hydraulic excavator 100 is inclined about the Z-axis. In the present embodiment, the pitch angle and the roll angle are referred to as posture angles of the hydraulic excavator 100.

FIG. 2 is a block diagram illustrating an example of the IMU 30. The IMU 30 includes a central processing unit (CPU) 31, a main memory 31a, a gyroscope sensor 32, an acceleration sensor 33, an inclination sensor 34, a temperature sensor 35, a non-volatile memory 36, and a communication unit 37.

The above-described components of the IMU 30 are housed in a sealed housing (not shown).

The CPU 31 includes therein hardware such as an arithmetic device, a control device, a storage device such as a volatile memory or a non-volatile memory, an input-output device, a timer, a counter, and an analog-digital (A/D) conversion device, and controls each unit by executing a program stored in the storage device. In the present embodiment, the CPU 31 includes, as functional components configured by a combination of hardware and software such as a program, an angular velocity acquisition unit 311, a first acceleration acquisition unit 312, a second acceleration acquisition unit 313, a temperature acquisition unit 314, a correction value calculation unit 315, an acceleration correction unit 316, a posture angle calculation unit 317, and a storage unit 318. Here, the storage unit 318 is, for example, a cache memory provided inside the CPU 31.

The main memory 31a is a so-called main storage device, is provided outside the CPU 31, and provides a storage area that can be directly read and written in arithmetic processing performed by the CPU.

The gyroscope sensor 32 detects angular velocities of three axes, and outputs signals indicating the detected angular velocities (hereinafter, signals indicating angular velocities are also referred to as angular velocities) to the CPU 31.

The acceleration sensor 33 detects accelerations in three axes of the X-axis direction, the Y-axis direction, and the Z-axis direction, and outputs a signal indicating the detected accelerations (hereinafter the signals are also referred to as accelerations, and hereinafter the detected accelerations are also referred to as first acceleration) to the CPU 31. The acceleration sensor 33 is, for example, a mechanical acceleration sensor having a mechanically movable portion, such as an acceleration sensor of an electrostatic capacitance detection type or an acceleration sensor of a piezoresistance type. Here, the mechanical operation is, for example, deformation, sliding, or the like of a solid member.

The inclination sensor 34 detects accelerations in two axes of the X-axis direction and the Y-axis direction, and outputs a signal indicating the detected accelerations (hereinafter also referred to as second acceleration) to the CPU 31. The inclination sensor 34 is, for example, a non-mechanical acceleration sensor that does not include a mechanically movable portion, such as a thermal detection type acceleration sensor or a liquid-sealed type acceleration sensor. The thermal detection type acceleration sensor detects acceleration by heating a sealed gas by a heater and measuring a change in convection due to acceleration such as acceleration of gravity on the basis of a change in temperature. The liquid sealed type acceleration sensor detects acceleration by measuring a change in liquid level in a chamber on the basis of a change in electrostatic capacitance. As compared with the mechanical acceleration sensor, the non-mechanical acceleration sensor has features such that adhering of a member does not occur, mechanical and temperature hysteresis does not occur or is small, a mechanical resonance point does not exist, and impact resistance is high because there is no mechanically movable portion. On the other hand, as compared with the non-mechanical acceleration sensor, the mechanical acceleration sensor has features of good frequency characteristics, that is, a measurement frequency band is wide. In addition, the inclination sensor 34 may detect acceleration in three axes of the X-axis direction, the Y-axis direction, and the Z-axis direction, for example.

The temperature sensor 35 detects an ambient temperature of the IMU 30 and outputs a signal indicating the detected temperature to the CPU 31.

The angular velocity acquisition unit 311 acquires an angular velocity from the gyroscope sensor 32. The angular velocity acquisition unit 311 repeatedly acquires angular velocities of three axes from the gyroscope sensor 32 in a predetermined cycle, and stores, for example, the latest angular velocities of a predetermined period of time in a main memory 31a or in a predetermined storage area of the storage unit 318.

The first acceleration acquisition unit 312 acquires the first acceleration from the acceleration sensor 33, which is a mechanical acceleration sensor. The first acceleration acquisition unit 312 repeatedly acquires the accelerations of the three axes from the acceleration sensor 33 in a predetermined cycle and stores, for example, the latest first acceleration of a predetermined period of time in the main memory 31a or in a predetermined storage area of the storage unit 318.

The second acceleration acquisition unit 313 acquires the second acceleration from the inclination sensor 34, which is a non-mechanical acceleration sensor. The second acceleration acquisition unit 313 repeatedly acquires the accelerations of the two axes from the inclination sensor 34 in a predetermined cycle and stores, for example, the latest second accelerations of a predetermined period of time in the main memory 31a or in a predetermined storage area of the storage unit 318.

The temperature acquisition unit 314 acquires a signal indicating a temperature from the temperature sensor 35. The temperature acquisition unit 314 repeatedly acquires the signal indicating a temperature from the temperature sensor 35 at a predetermined cycle and stores, for example, a signal indicating the latest temperature of a predetermined period of time in a main memory 31a or in a predetermined storage area of the storage unit 318.

The correction value calculation unit 315 calculates a correction value (hereinafter referred to as an acceleration correction value) for correcting the first acceleration by using the second acceleration. For example, the correction value calculation unit 315 obtains, as the acceleration correction value, a difference between the latest average value of the first acceleration of a predetermined period of time and the latest average value of the second acceleration of a predetermined period of time. At this time, the correction value calculation unit 315 calculates the acceleration correction value for each axis. Here, the predetermined period of time is, for example, 10 seconds.

Further, the correction value calculation unit 315 may determine, for example, whether or not the stationary state has continued for a predetermined period of time, and calculate the acceleration correction value when the correction value calculation unit 315 determines that the stationary state has continued. Although it is difficult to calculate the acceleration correction value, which is an offset, due to noise or delay of acceleration during operation, the offset can be calculated with high accuracy in the stationary state. Whether or not the hydraulic excavator 100 is in the stationary state can be determined, for example, when a three axis composite value of angular velocities, a value representing a change amount of angular velocity, first acceleration, second acceleration, or the like, is smaller than a predetermined threshold, or can be determined based on a signal indicating whether or not the hydraulic excavator 100 is in the stationary state or a signal indicating vehicle speed received from the vehicle body controller 40. Here, the signal indicating whether or not the hydraulic excavator 100 is in a stationary state may be, for example, a signal indicating that a lock lever included in an operation device is in an operated state, a signal indicating that all operation levers are in a neutral state, or the like.

For example, the correction value calculation unit 315 may determine whether or not the inclination angle detected by the inclination sensor 34, which is a non-mechanical acceleration sensor, is equal to or less than a specified value, and calculate the acceleration correction value when the correction value calculation unit 315 determines that the inclination angle is equal to or less than the specified value. Here, equal to or less than the specified value is, for example, ±5 degrees or ±10 degrees. Some of the inclination sensors 34 can detect acceleration particularly accurately in the vicinity of the horizontal position, and when such an inclination sensor 34 is used, the acceleration correction value can be calculated more accurately.

In addition, the correction value calculation unit 315 may determine whether or not a temperature change for a predetermined time detected by the temperature sensor 35 is equal to or less than a predetermined value, and may calculate the acceleration correction value when it is determined that the temperature change is equal to or less than the predetermined value. When the temperature change is large, a slight fluctuation in the acceleration output from the acceleration sensor 33 or the inclination sensor 34 may occur, and thus, the acceleration correction value can be calculated more accurately by limiting the calculation to the case where the temperature change is small. The predetermined value is, for example, one minute.

In addition, in a case where a sealed housing is adopted, it is possible to suppress variation in temperature change in the housing and to improve accuracy of an output value of the thermal-type inclination sensor 34.

Further, the correction value calculation unit 315 may determine whether or not a certain period of time has elapsed after the start of the IMU 30 or the hydraulic excavator 100, and calculate the acceleration correction value when the correction value calculation unit 315 determines that the certain period of time has elapsed. There is a case where the temperature change is relatively large at the time of starting, and thus, the acceleration correction value can be calculated more accurately by performing the calculation after a predetermined period of time has elapsed from the start.

In addition, the correction value calculation unit 315 may store the acceleration correction value in the non-volatile memory 36 only once in one start. Since the acceleration correction value does not change frequently and the non-volatile memory 36 generally has a limit on the number of times of writing, it is possible to make the writing frequency appropriate by setting the number of times of writing to one in one start. However, when receiving a predetermined correction command from the vehicle body controller 40 or the like, the correction value calculation unit 315 may store the newly calculated acceleration correction value in the non-volatile memory 36 without limiting the number of times of storage.

For example, the acceleration correction unit 316 reads, at a time of initialization after starting of the CPU 31 or after receiving the correction command, the previously stored acceleration correction value 361 from the non-volatile memory 36, stores it in a predetermined storage area of the main memory 31a or the storage unit 318, corrects a value of the first acceleration acquired by the first acceleration acquisition unit 312 based on the acceleration correction value 361 stored in the main memory 31a or the storage unit 318, and outputs it to the posture angle calculation unit 317. The value of the first acceleration is, for example, a component in the X-axis direction and a component in the Y-axis direction of the first acceleration. According to this configuration, when there is no correction command, the correction value is not changed during the start of the hydraulic excavator 100, but is reflected at the next start. However, as a modification example, the correction value may be reflected during the start. In addition, the timing at which the value of the first acceleration is corrected may be corrected at a specific timing such as a stationary state.

For example, the posture angle calculation unit 317 calculates a posture angle based on the angular velocity acquired by the angular velocity acquisition unit 311, the first acceleration corrected by the acceleration correction unit 316, and the value of the first acceleration acquired by the first acceleration acquisition unit 312, and transmits information indicating the calculated posture angle to the vehicle body controller 40. The first acceleration corrected by the acceleration correction unit 316 is, for example, a component in the X-axis direction and a component in the Y-axis direction of the first acceleration, and the value of the first acceleration acquired by the first acceleration acquisition unit 312 is, for example, a component in the Z-axis direction of the first acceleration. A method of calculating the posture angle is not limited, and for example, a method described in Patent Document 1 can be used.

The non-volatile memory 36 stores data such as the acceleration correction value 361 so as to be rewritable.

The communication unit 37 communicates with the vehicle body controller 40 via an in-vehicle signal line 41 based on a standard such as a controller area network (CAN).

Figure 3:
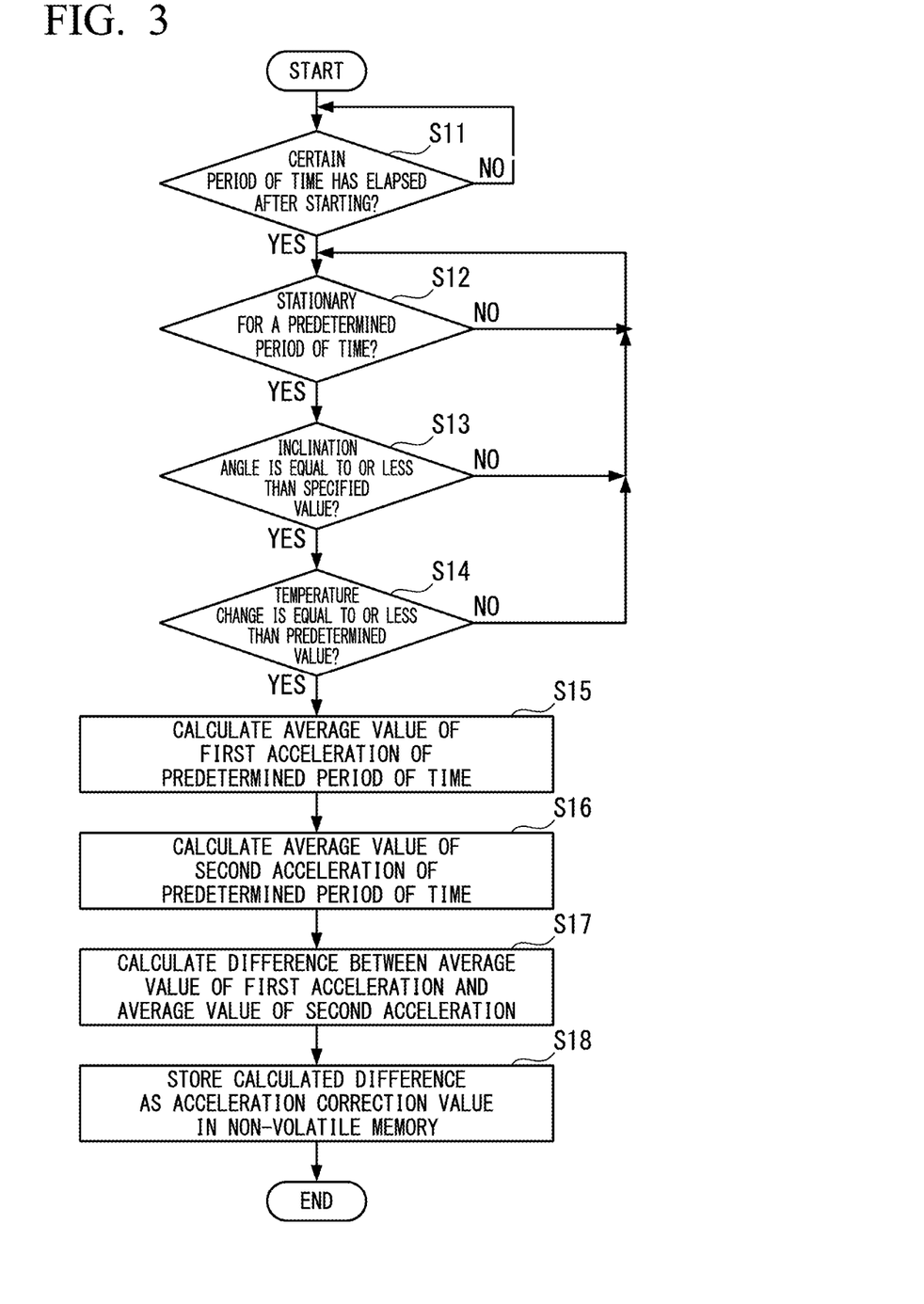
FIG. 3 is a flowchart showing an operation example of the correction value calculation unit 315 shown in FIG. 2.

Next, an operation example of the correction value calculation unit 315 shown in FIG. 2 will be described with reference to FIG. 3. FIG. 3 is a flowchart showing an operation example of the correction value calculation unit 315 shown in FIG. 2. The processing shown in FIG. 3 is started when the CPU 31 is started.

When the process shown in FIG. 3 is started, first, the correction value calculation unit 315 determines whether or not a certain period of time has elapsed after starting (step S11). When the certain period of time has elapsed, the correction value calculation unit 315 determines that the certain period of time has elapsed after starting ("YES" in step S11), and then determines whether or not a stationary state has been continued for a predetermined period of time (step S12).

When the predetermined period of time has elapsed in the stationary state, the correction value calculation unit 315 determines that the stationary state has continued for the predetermined period of time ("YES" in step S12), and then determines whether or not the inclination angle is equal to or less than the specified value (step S13). When the inclination angle is not equal to or less than the specified value ("NO" in step S13), the correction value calculation unit 315 returns to step S12 and waits again until the stationary state continues for the predetermined period of time ("NO" is repeated in step S12). On the other hand, when the inclination angle is equal to or smaller than the specified value ("YES" in step S13), the correction value calculation unit 315 next determines whether the temperature change is equal to or smaller than a predetermined value (step S14).

When the temperature change is not equal to or less than the predetermined value ("NO" in step S14), the correction value calculation unit 315 returns to step S12 and waits again until the stationary state continues for the predetermined period of time ("NO" is repeated in step S12). On the other hand, if the temperature change is equal to or less than the predetermined value ("YES" in step S14), the correction value calculation unit 315 calculates the average value of the first acceleration of a predetermined period of time (step S15). Next, the correction value calculation unit 315 calculates an average value of the second acceleration for a predetermined period of time (step S16). Next, the correction value calculation unit 315 calculates the difference between the average value of the first acceleration of the predetermined period of time and the average value of the second acceleration of the predetermined period of time for each of the axes (step S17). In addition, in step S17, upper and lower limit values may be set for the difference, and when the difference exceeds the upper and lower limit values, the value of the difference may be limited by the upper limit value or the lower limit value.

Next, the correction value calculation unit 315 stores the calculated difference in the non-volatile memory 36 as the acceleration correction value 361 for each of the axes (step S18), and ends the processing.

When the communication unit 37 receives the correction command from the vehicle body controller 40 after the correction value calculation unit 315 stores the calculated difference in the non-volatile memory 36, the correction value calculation unit 315 returns to step S12 and waits until the stationary state continues for the predetermined time (repeats "NO" in step S12).

As a result of the above-described processing, the correction value calculation unit 315 calculates an acceleration correction value and stores the acceleration correction value in the non-volatile memory 36 when the stationary state continues for a predetermined period of time after the certain period of time has elapsed since starting, the inclination angle during the predetermined period of time is equal to or less than a specified value, and the temperature change during the predetermined period of time is equal to or less than a predetermined value. Here, the predetermined period of time may be the same or may not be the same as the period of time in the determination of the stationary state.

As described above, according to the present embodiment, since the output of the acceleration sensor 33, which is a mechanical acceleration sensor, can be corrected using the inclination sensor 34, which is a non-mechanical acceleration sensor that is less likely to change over time, a change in the detection characteristics of acceleration can be reduced compared to a case where correction is not performed.

In addition, reference values for determination of threshold values or the like in each determination illustrated in FIG. 3 may be changed in a freely-selected manner in response to a command from the vehicle body controller 40, for example.

The above-described mechanical acceleration sensor is, for example, a sensor having a mechanically movable portion such as micro electro mechanical systems (MEMS), and has good responsiveness. However, since the mechanical acceleration sensor has the movable portion, it deteriorates over time, that is, a characteristic change over time is likely to occur. On the other hand, the non-mechanical acceleration sensor is, for example, a thermal type inclinometer and does not have a mechanical movable portion. Therefore, deterioration over time is small, but quick movement cannot be detected. The inclination sensor 34 may be, for example, a mechanical acceleration sensor having a small range.

Although, in FIG. 1, one IMU 30 is provided below the operator's seat 40 of the upper swing body 3, the IMU may be provided, for example, in each of the boom 6, the arm 7, and the bucket 8, or part thereof in addition to the upper swing body 3. In addition, when a plurality of IMUs are provided, the above-described correction command may be transmitted to all of the IMUs at once or may be transmitted individually.

Further, in FIG. 2, the main memory 31a and the non-volatile memory 36 are configured separately from the CPU 31, but both or one of the main memory 31a and the non-volatile memory 36 may be included in the CPU 31.

Further, in the above-described embodiment, the IMU 30 is one aspect of the acceleration detection sensor according to the present disclosure. However, the aspect of the present disclosure is not limited thereto, and may be regarded as a device that does not include the gyroscope sensor 32 and detects acceleration including the acceleration sensor 33, the inclination sensor 34, the CPU 31, and the like, or may be regarded as an IMU including the gyroscope sensor 32 instead of the acceleration detection sensor. The temperature sensors 35 may be omitted from the IMU 30 illustrated in FIG. 2. Alternatively, in a case where the gyroscope sensor 32, the acceleration sensor 33, the inclination sensor 34, and the like include a temperature sensor, said temperature sensor may be used instead of the temperature sensor 35.

The work machine may be, for example, a bulldozer, a dump truck, or the like.

In the above-described embodiment, the acceleration correction value is the difference between the first acceleration and the second acceleration, but is not limited thereto; for example, the acceleration correction value may be a value calculated based on each difference between a plurality of first accelerations and a plurality of second accelerations measured by a plurality of different inclination sensors.

Although the embodiments of the present invention have been described above with reference to the drawings, specific configurations are not limited to the above-described embodiments, and design changes and the like within a scope not departing from the gist of the present invention are also included. Some or all of the program executed by the CPU 31 can be distributed via a computer-readable recording medium, a communication line, or the like.

INDUSTRIAL APPLICABILITY

According to each aspect of the present disclosure, it is possible to reduce a change in performance of the mechanical acceleration sensor in acceleration detection.

The invention claimed is:

1. An acceleration detection device, comprising:
a first acceleration acquisition unit configured to acquire a first acceleration from a mechanical acceleration sensor provided at a work machine including work equipment;
a second acceleration acquisition unit configured to acquire a second acceleration from a non-mechanical acceleration sensor provided at the work machine; and
a correction value calculation unit configured to calculate a correction value for correcting the first acceleration by using the second acceleration,
wherein the correction value calculation unit is configured to:
determine whether the work machine has been in a stationary state for a predetermined period of time, and
calculate the correction value based on determining that the work machine has been in the stationary state for the predetermined period of time.

2. The acceleration detection device according to claim 1, wherein the correction value calculation unit calculates a difference between the first acceleration and the second acceleration as the correction value.

3. The acceleration detection device according to claim 1, wherein the correction value calculation unit determines whether or not an inclination angle detected by the non-mechanical acceleration sensor is equal to or less than a specified value, and calculates the correction value when the correction value calculation unit determines that the inclination angle is equal to or less than the specified value.

4. The acceleration detection device according to claim 1, wherein the correction value calculation unit determines whether a temperature change is equal to or less than a predetermined value, and calculates the correction value when the correction value calculation unit determines that the temperature change is equal to or less than the predetermined value.

5. The acceleration detection device according to claim 1, wherein the correction value calculation unit calculates the correction value when the correction value calculation unit determines that a certain period of time has elapsed after starting.

6. The acceleration detection device according to claim 1, wherein the work machine comprises at least one of an excavator, a bulldozer, or a dump truck.

7. An acceleration detection method, comprising:
acquiring a first acceleration from a mechanical acceleration sensor provided at a work machine including work equipment;
acquiring a second acceleration from a non-mechanical acceleration sensor provided at the work machine; and
calculating a correction value for correcting the first acceleration by using the second acceleration,
wherein calculating the correction value comprises:
determining whether the work machine has been in a stationary state for a predetermined period of time, and
calculating the correction value based on determining that the work machine has been in the stationary state for the predetermined period of time.

8. The acceleration detection method according to claim 7, wherein the work machine comprises at least one of an excavator, a bulldozer, or a dump truck.

9. The acceleration detection method according to claim 7, further comprising:
comparing a change amount of at least one of the first acceleration or the second acceleration to a predetermined threshold; and
based on the change amount being less than the predetermined threshold, determining that the work machine is in the stationary state.

10. The acceleration detection method according to claim 7, further comprising:
determining that the work machine is in the stationary state based on receiving a signal indicating that a lock lever of the work machine is in an operated state.

11. The acceleration detection method according to claim 7, further comprising:
determining that the work machine is in the stationary state based on receiving a signal indicating that all operation levers of the work machine are in a neutral state.

12. The acceleration detection device according to claim 1, wherein the mechanical acceleration sensor comprises an electrostatic capacitance detection sensor or a piezoresistance sensor, and
wherein the non-mechanical acceleration sensor comprises a thermal detection sensor or a liquid level sensor.

13. The acceleration detection device according to claim 1, where in the work equipment includes at least one of a boom, an arm, a bucket, a boom cylinder, an arm cylinder, or a bucket cylinder.

* * * * *